W. H. STEVENS.
DRAFT GAGE.
APPLICATION FILED JULY 1, 1916.
1,255,063.
Patented Jan. 29, 1918.
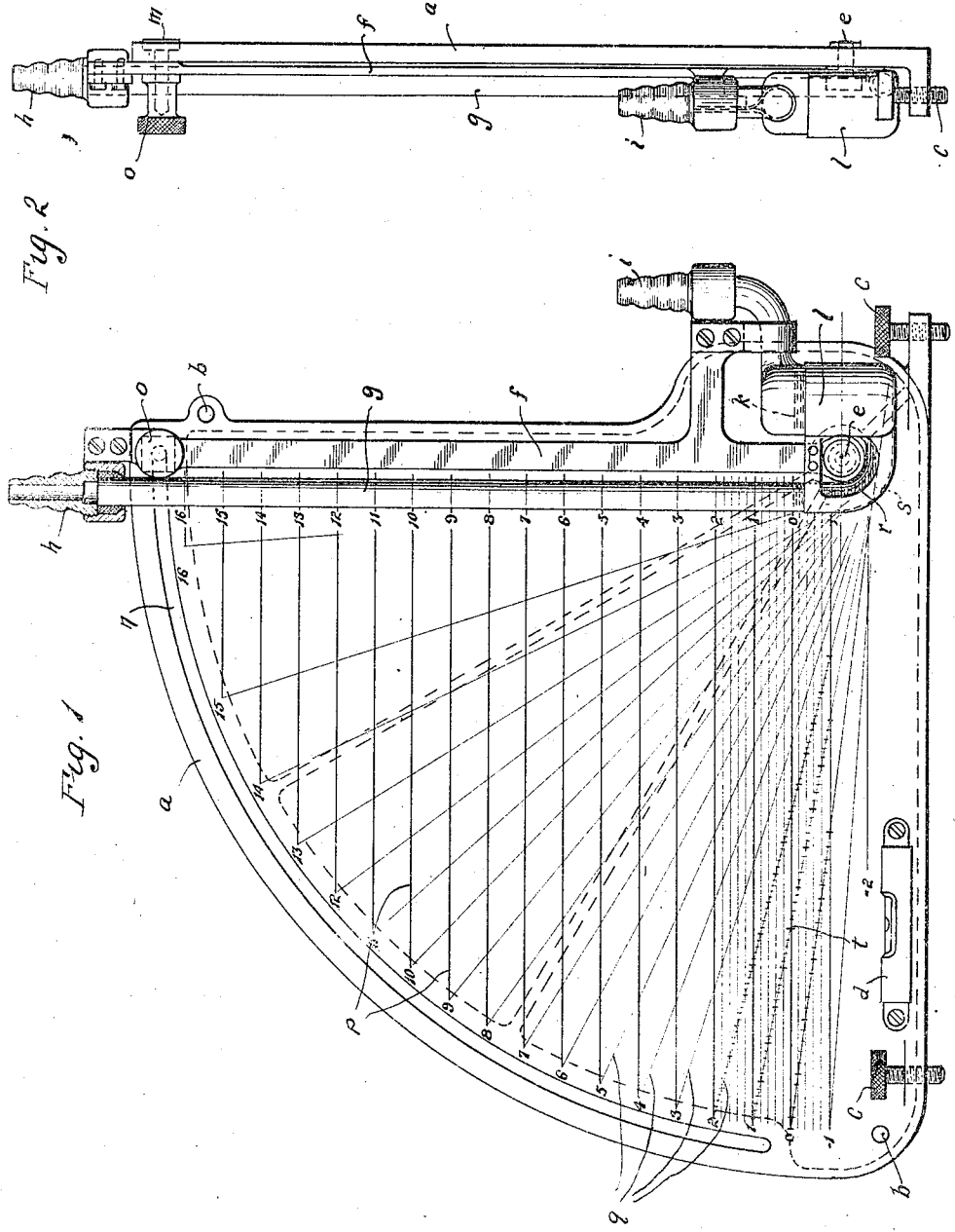

UNITED STATES PATENT OFFICE.

WILLIAM H. STEVENS, OF ALTOONA, PENNSYLVANIA.

DRAFT-GAGE.

1,255,063.

Specification of Letters Patent. Patented Jan. 29, 1918.

Application filed July 1, 1916. Serial No. 107,009.

*To all whom it may concern:*

Be it known that I, WILLIAM H. STEVENS, a citizen of the United States, residing at Altoona, in the county of Blair and State of Pennsylvania, have invented certain new and useful Improvements in Draft-Gages, of which the following is a specification.

The invention relates to draft gages and has for its principal objects, the provision of a gage which can be used in a plurality of inclined positions, depending upon the degree of draft, and in which the length of the scale employed for relatively low degrees of draft is increased, giving a finer and more accurate reading than is the case with a fixed vertical gage; and the provision of a gage which can be used to take the place of a plurality of differently inclined gages as heretofore employed. One embodiment of the invention is illustrated in the accompanying drawings, wherein—

Figure 1 is a side elevation of the apparatus, and Fig. 2 is an elevation of the front edge of the apparatus.

Referring to the drawings, $a$ is a graduated sector preferably of metal, which may be supported in an upright position by means of a nail or other fastening device extending through the openings $bb$ and into a board or wall. The sector may be leveled by means of a pair of set screws $c$, $c$, extending through the base of the sector and engaging supporting means (not shown) extending at right angles from the surface against which the sector is supported, the level $d$ carried by the sector, assisting in performing this function.

Mounted for pivotal movement upon the sector by means of the screw $e$ is the framework $f$ which carries the glass U-tube $g$. This U-tube has the connections $h$ and $i$ at its ends for attachment to the usual draft tubes. The lower portion of the tube carries the usual measuring liquid $k$, the major part of which is carried by the reservoir $l$ which forms the short end of the U-tube.

In order to maintain the tube at any angle in which it may be placed, the screw $m$ is employed extending through the slot $n$ in the sector and carrying at its front end the thumb nut $o$.

The face of the sector is provided with the horizontal graduating lines $p$, a part only of which are shown, and with the inclined lines $q$, the lower three of which only are shown as graduated. The inclined lines $q$ extend tangentially from the curved center line $r$ at the lower end of the tube to the numerals 1, 2, 3, 4, etc., at the edge of the sector, the lowest one of the inclined lines leading from $o$ at the edge of the sector and being shown extended in the dot-and-dash line $s$ so that it touches such center line tangentially.

The tube $g$ can be adjusted around its pivot $e$ so that its center line coincides with any one of the inclined graduated lines $q$, and by this means the length of the scale upon which the height of the liquid in the tube is measured can be increased in length giving a finer and more accurate reading than is the case where the tube is used in the vertical position only. For instance, when the tube $g$ is inclined so that its center line lies over the inclined graduated line terminating in the numeral 1, and the level of the liquid lies between the horizontal lines $o$ and $l$, the scale on which the height of the liquid may be read extends from the point marked $t$ to the numeral 1, a distance approximately five times as great as the vertical distance between the lines $o$ and $l$.

It will be seen that the apparatus is one which may be easily adjusted to suit requirements and that it will perform the work of a plurality of the ordinary inclined gages which are fixed in position, and therefore have a limited range of use. The advantage of the gage and its method of use will be readily apparent to those skilled in the art without further explanation.

What I claim is:

1. In combination in a gage, a U-tube comprising an indicating arm through which the height of the liquid therein may be observed and a reservoir communicating with the lower end of such arm, means whereby the arm and its reservoir are mounted for swinging movement about a pivot at the lower end of the arm, and a surface over which the arm swings provided with graduations for reading the height of level of the liquid in the arm at its different positions of inclination.

2. In combination in a gage, a U-tube comprising an indicating arm through which the height of the liquid therein may be observed and a reservoir communicating with the lower end of such arm, means whereby the arm and its reservoir are mounted for swinging movement about a pivot at the lower end of the arm, and an upright sector over which the arm swings, such sector being provided with horizontal graduations and with radial lines crossing the horizontal graduations and provided with other graduations constituting scales.

W. H. STEVENS.